United States Patent
Kaneda et al.

(10) Patent No.: US 9,421,888 B2
(45) Date of Patent: Aug. 23, 2016

(54) SEAT DEVICE FOR VEHICLE

(71) Applicant: TS TECH CO., LTD., Asaka-shi, Saitama (JP)

(72) Inventors: Takuji Kaneda, Tochigi (JP); Takeshi Sato, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/419,518

(22) PCT Filed: Jun. 21, 2013

(86) PCT No.: PCT/JP2013/067102
§ 371 (c)(1),
(2) Date: Feb. 4, 2015

(87) PCT Pub. No.: WO2014/024584
PCT Pub. Date: Feb. 13, 2014

(65) Prior Publication Data
US 2015/0175038 A1    Jun. 25, 2015

(30) Foreign Application Priority Data

Aug. 7, 2012    (JP) .................................. 2012-175355

(51) Int. Cl.
*B60N 2/02*    (2006.01)
*B60N 2/48*    (2006.01)
(Continued)

(52) U.S. Cl.
CPC ............... *B60N 2/36* (2013.01); *B60N 2/4613* (2013.01); *B60N 2/6009* (2013.01); *B60N 2/682* (2013.01);
(Continued)

(58) Field of Classification Search
CPC .. B60N 2/4613; B60N 2/4633; B60N 2/5825; B60N 2/366; B60N 2/363; B60N 2/3038; B60N 2/3002; B60N 2002/363; B60R 21/026

USPC ............... 297/411.38, 188.1, 14, 113, 238, 297/411.32, 188.14, 188.15, 188.19
See application file for complete search history.

(56) References Cited

U.S. PATENT DOCUMENTS 5,628,543 A * 5/1997 Filipovich ............ B60N 2/4613
296/37.1
6,073,996 A    6/2000 Hatsuta et al.
(Continued)

FOREIGN PATENT DOCUMENTS

CN    101674952 A    3/2010
JP    H09187342 A    7/1997
(Continued)

OTHER PUBLICATIONS

Official Communications dated Mar. 2, 2016 corresponding to Chinese Patent Application No. 201380041460.2.

*Primary Examiner* — Chi Q Nguyen
(74) *Attorney, Agent, or Firm* — Carrier Blackman & Associates, P.C.; William D. Blackman; Joseph P. Carrier

(57) ABSTRACT

A seat device for a vehicle includes a seat back, an auxiliary member supported on the seat back and can pivot between a storage position at which the auxiliary member is housed in a housing recess part and a projecting position at which the auxiliary member projects forward of the seat back, and an inner board that closes a rear opening face of the housing recess part, a board support member having a retaining groove into which a lower end part of the inner board is fitted from above, wherein a latching projection and a latching groove are formed respectively on one and the other of opposing faces of the retaining groove and the lower end part of the inner board fitted thereinto, the latching projection and the latching groove being engaged with each other for suppressing upward movement of the inner board.

8 Claims, 12 Drawing Sheets

(51) Int. Cl.
*B60N 2/36* (2006.01)
*B60N 2/68* (2006.01)
*B60N 3/10* (2006.01)
*B60N 2/60* (2006.01)
B60N 2/30 (2006.01)
B60N 2/46 (2006.01)
B60R 21/02 (2006.01)
B60N 2/58 (2006.01)

(52) U.S. Cl.
CPC  *B60N 2/686* (2013.01); *B60N 3/10* (2013.01); *B60N 3/101* (2013.01); *B60N 2/3002* (2013.01); *B60N 2/3038* (2013.01); *B60N 2/366* (2013.01); *B60N 2/4633* (2013.01); *B60N 2/5825* (2013.01); *B60N 2002/363* (2013.01); *B60R 21/026* (2013.01)

(56) References Cited

U.S. PATENT DOCUMENTS

| | | | | |
|---|---|---|---|---|
| 6,547,323 | B1* | 4/2003 | Aitken | B60N 3/002 108/44 |
| 7,114,772 | B2* | 10/2006 | Kobayashi | B60N 3/103 297/188.04 |
| 9,120,406 | B2* | 9/2015 | Sato | B60N 2/4228 |
| 9,145,075 | B2* | 9/2015 | Andersson | B60N 2/46 |
| 9,180,803 | B2* | 11/2015 | Cleary | B60N 3/14 |
| 2008/0150341 | A1* | 6/2008 | Salewski | B60N 2/4613 297/411.38 |
| 2010/0148561 | A1 | 6/2010 | Runde | |
| 2010/0156128 | A1* | 6/2010 | Dexter | B60N 2/305 296/24.34 |
| 2010/0244502 | A1* | 9/2010 | Andersson | B60N 2/4613 297/118 |
| 2011/0316310 | A1* | 12/2011 | Runde | B60N 2/4613 297/113 |

FOREIGN PATENT DOCUMENTS

| | | |
|---|---|---|
| JP | 2001-211964 A | 8/2001 |
| JP | 2006280747 A | 10/2006 |
| JP | 2008194368 A | 8/2008 |

* cited by examiner

SEAT DEVICE FOR VEHICLE

TECHNICAL FIELD

The present invention relates to an improvement of a seat device for a vehicle that includes a seat back, an auxiliary member that is axially supported on the seat back and can pivot between a storage position at which it is housed in a housing recess part formed so as to extend through a cushion pad of the seat back and a projecting position at which it projects forward of the seat back, and an inner board that closes a rear opening face of the housing recess part, a board support member having a retaining groove into which a lower end part of the inner board is fitted from above being mounted on a frame of the seat back.

BACKGROUND ART

Such a seat device for a vehicle is known, as disclosed in Patent Document 1.

RELATED ART DOCUMENTS

Patent Documents

Patent Document 1: Japanese Patent Application Laid-open No. 2001-211964

SUMMARY OF THE INVENTION

Problems to be Solved by the Invention

In the seat device for a vehicle disclosed in Patent Document 1 above, in order to suppress disengagement of a lower end part of an inner board that is fitted into a retaining groove of a board support member, the inner board is secured to the board retaining member by means of a tacker. However, since the operation of securing by means of a tacker needs to be carried out in a confined space beneath a seat back, it is difficult and requires skill.

The present invention has been accomplished in light of such circumstances, and it is an object thereof to provide a seat device for a vehicle that, without using a special securing member such as a tacker, enables disengagement of a lower end part of an inner board that is fitted into a retaining groove of a board support member to be easily suppressed.

Means for Solving the Problems

In order to attain the above object, according to a first aspect of the present invention, there is provided a seat device for a vehicle, comprising a seat back, an auxiliary member that is axially supported on the seat back and can pivot between a storage position at which the auxiliary member is housed in a housing recess part formed so as to extend through a cushion pad of the seat back and a projecting position at which the auxiliary member projects forward of the seat back, and an inner board that closes a rear opening face of the housing recess part, a board support member having a retaining groove into which a lower end part of the inner board is fitted from above being mounted on a frame of the seat back, characterized in that a latching projection and a latching groove are formed respectively on one and the other of opposing faces of the retaining groove and the lower end part of the inner board fitted thereinto, the latching projection and the latching groove being engaged with each other so as to suppress upward movement of the inner board.

Further, according to a second aspect of the present invention, in addition to the first aspect, the latching groove is formed in a side face of the inner board across the whole width in the left-and-right direction, and the latching projection is formed on an inside face of the retaining groove.

Furthermore, according to a third aspect of the present invention, in addition to the first or second aspect, the latching projection is molded into a rib shape integrally with the board support member.

Moreover, according to a fourth aspect of the present invention, in addition to the second or third aspect, the board support member is formed from a bottom wall portion, and a front wall portion and rear wall portion that rise from front and rear edges of the bottom wall portion so as to define the retaining groove therebetween, the latching projection is formed so as to bend from an upper end part of one of the front wall portion and the rear wall portion toward the retaining groove side, and the board support member and the latching projection are integrally molded.

Further, according to a fifth aspect of the present invention, in addition to the fourth aspect, the latching projection is formed on the rear wall portion, and the front wall portion is formed so as to extend higher than the rear wall portion.

Furthermore, according to a sixth aspect of the present invention, in addition to any one of the first to fifth aspects, a forwardly projecting support piece formed by punching from the rear is provided on a back panel that is secured to the frame and that covers a rear face of the seat back, the board support member is held between the support piece and the back panel, and the state in which the board support member is held by the support piece and the back panel can be visually checked through an opening, which is formed as a result of punching of the back panel for forming the support piece.

Effects of the Invention

In accordance with the first aspect of the present invention, since the latching projection and the latching groove that engage with each other to thus suppress upward movement of the inner board are formed respectively on one and the other of the opposing faces of the retaining groove of the board support member and the lower end part of the inner board fitted thereinto, it is possible, merely by fitting the lower end part of the inner board into the retaining groove, to suppress upward movement of the inner board due to engagement of the latching projection and the latching groove and, therefore, even if the inner board flexes forwardly due to it receiving a load from the rear, it is possible to prevent the inner board from disengaging from the retaining groove. Moreover, it becomes unnecessary to use a special securing member for suppressing disengagement of the inner board from the retaining groove, thus improving the simplification of the structure and ease of assembly of the seat device for a vehicle and contributing to a reduction in cost.

In accordance with the second aspect of the present invention, since the latching groove is formed over the whole width in the left-and-right direction on the side face of the inner board, and the latching projection is formed on the inside face of the retaining groove, it is possible to engage the latching projection with the latching groove at any position along the left-and-right direction of the inner board, thus improving the ease of assembly.

In accordance with the third aspect of the present invention, since the latching projection is molded integrally into a rib shape with the board support member, not only is it possible to avoid any increase in the number of components due to the latching projection, but it is also possible to reinforce the stiffness of the board support member due to the latching projection functioning as a reinforcing rib, thereby enhancing the engagement force with the latching groove.

In accordance with the fourth aspect of the present invention, since the board support member is formed from the bottom wall portion and the front wall portion and rear wall portion rising from the front and rear edges of the bottom wall portion and defining the retaining groove therebetween, the latching projection is formed so as to bend from an upper end part of one of the front wall portion and the rear wall portion toward the retaining groove side, and the board support member and the latching projection are integrally molded, it is possible for the board support member equipped with the latching projection to form one component, thus contributing to simplification of the structure of the seat device for a vehicle. Furthermore, the board support member, which is integrally formed from the bottom wall portion, the front wall portion, and the rear wall portion, gives a structure with a channel-shaped cross section having high stiffness, thus enabling the inner board to be strongly supported.

In accordance with the fifth aspect of the present invention, since in the board support member the latching projection is formed on the rear wall portion and the front wall portion is formed so as to extend higher than the rear wall portion, when the intermediate part of the inner board flexes forwardly due to application of a load from the rear, in the board support member the inner board tilts forwardly with the upper end of the front wall portion, which is tall, as the fulcrum, the latching groove on the rear face of the inner board accordingly engages more strongly with the latching claw on the upper end part of the rear wall portion, which is short, and upward disengagement of the inner board can be suppressed effectively.

In accordance with the sixth aspect of the present invention, since the back panel secured to the frame and covering the rear face of the seat back is provided with the support pieces, projecting upwardly to the front, formed by punching from the rear, and the board support member is held between the support pieces and the back panel, it is possible to mount the inner board on the frame without using a special support member, thus further contributing to simplification of the structure of the seat device for a vehicle and, moreover, since the state in which the board support member is held by the support pieces and the back panel can be visually checked through the openings resulting from punching of the back panel for forming the support pieces, it is possible to visually check the state of support of the inner board without providing an observation window exclusively used therefor in the back panel, thus enabling assembly faults to be prevented.

EXPLANATION OF REFERENCE NUMERALS AND SYMBOLS

Figure 1:
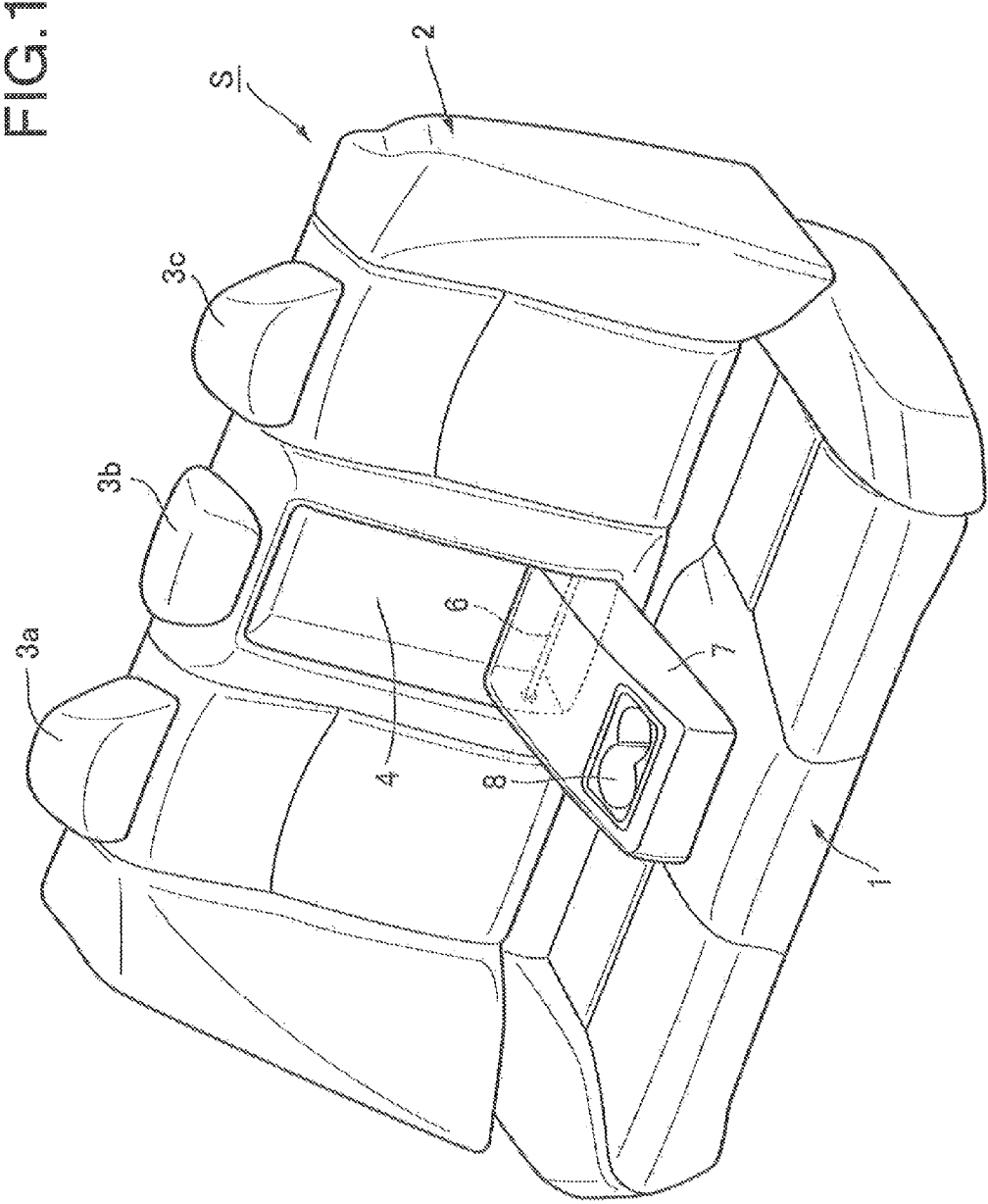
FIG. 1 is a front perspective view of a seat device for an automobile in accordance with one embodiment of the present invention.
Figure 2:
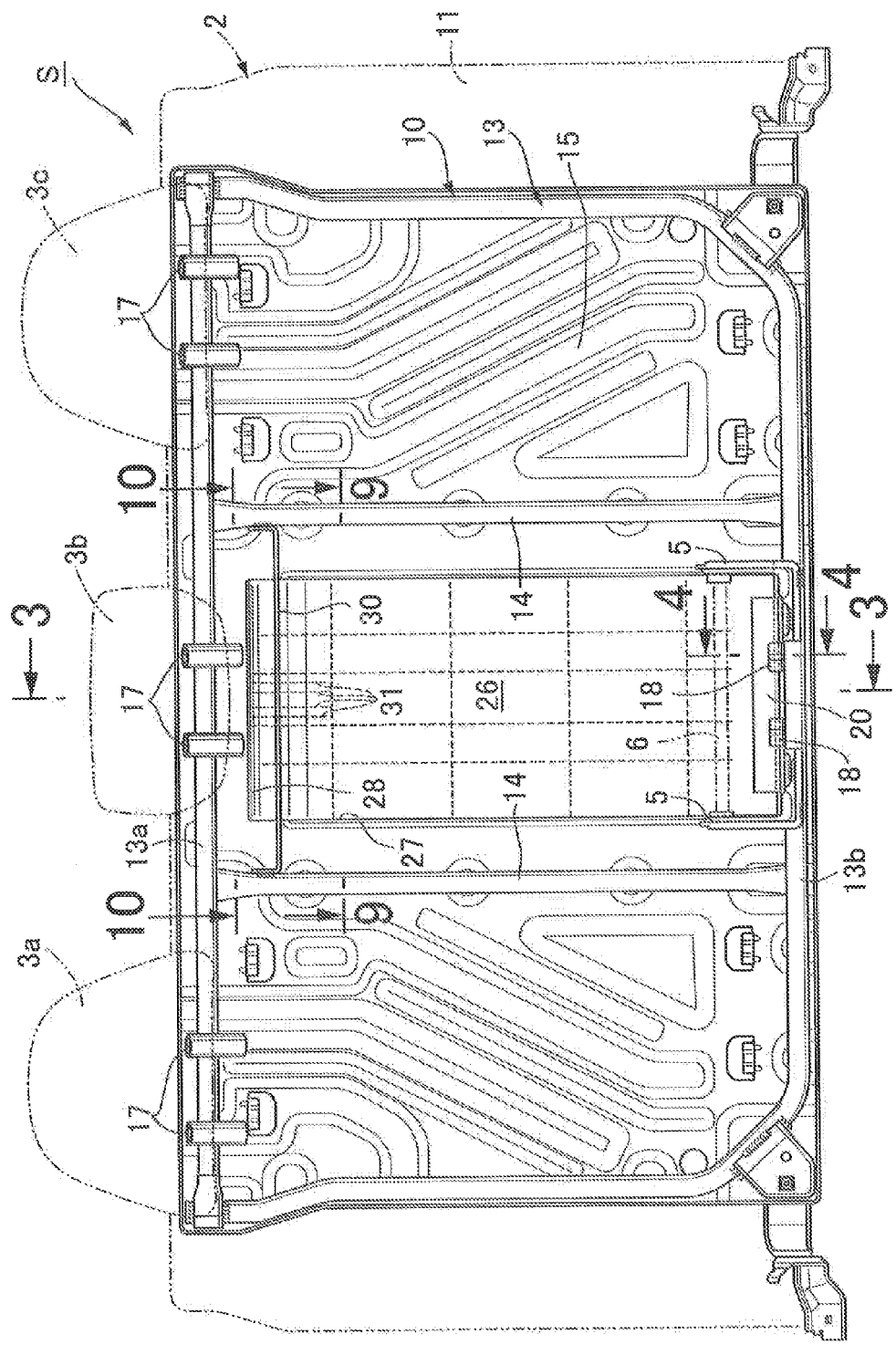
FIG. 2 is a front view showing an area around a frame of a seat back in FIG. 1.

S Seat
2 Seat back
4 Housing recess part
7 Auxiliary member (arm rest)
10 Frame
11 Cushion pad
15 Back panel
20 Board support member
20a Bottom wall portion
20b Front wall portion
20c Rear wall portion
21 Retaining groove
22 Latching projection
23 Opening
24 Latching groove
25 Support piece
26 Inner board

DETAILED DESCRIPTION OF ILLUSTRATIVE EMBODIMENTS

In the explanation below, front-and-rear and left-and-right are defined on the basis of an automobile as a vehicle to which the present invention is applied.

Figure 3:
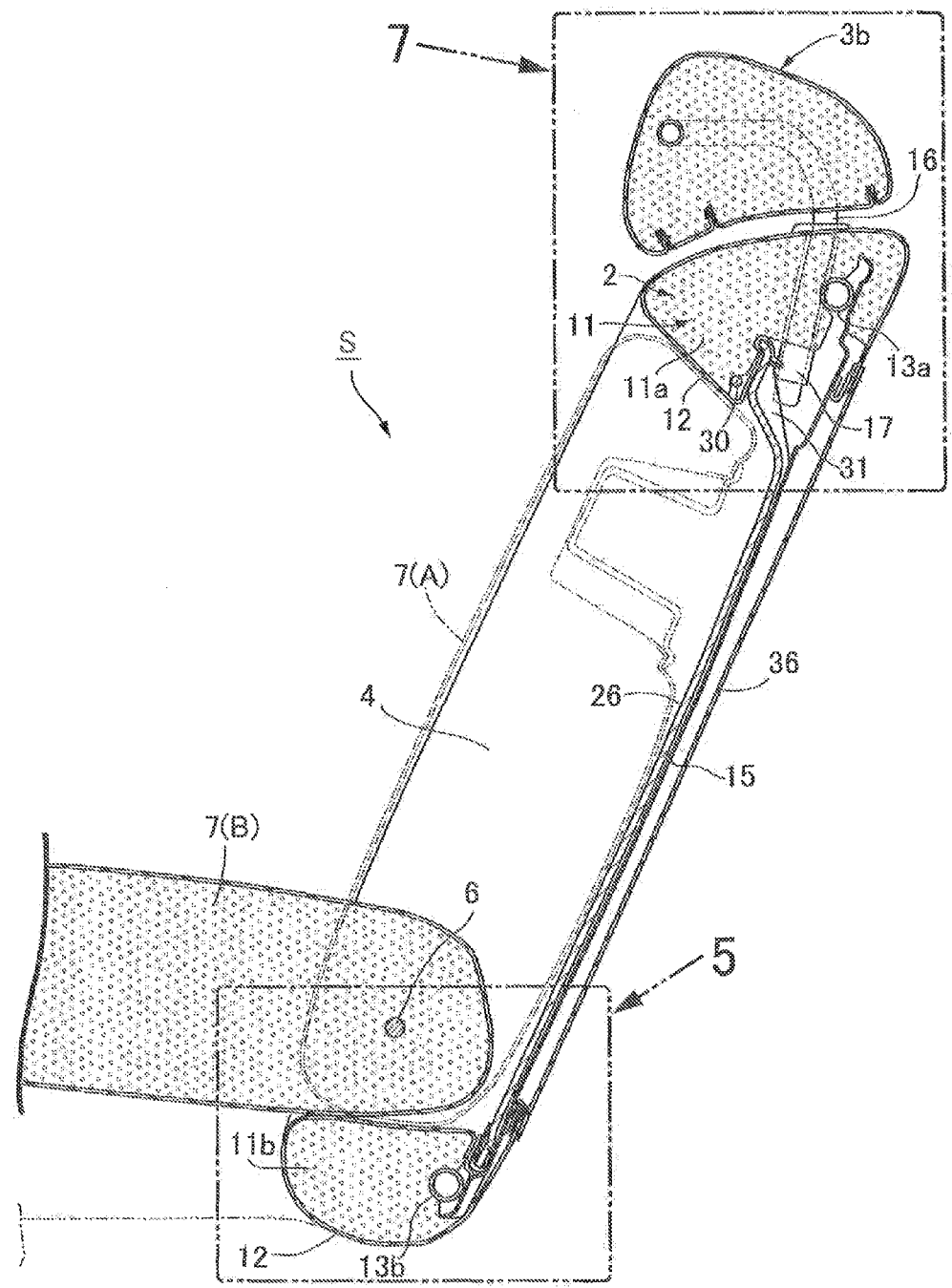
FIG. 3 is a sectional view along line 3-3 in FIG. 2.
Figure 4:
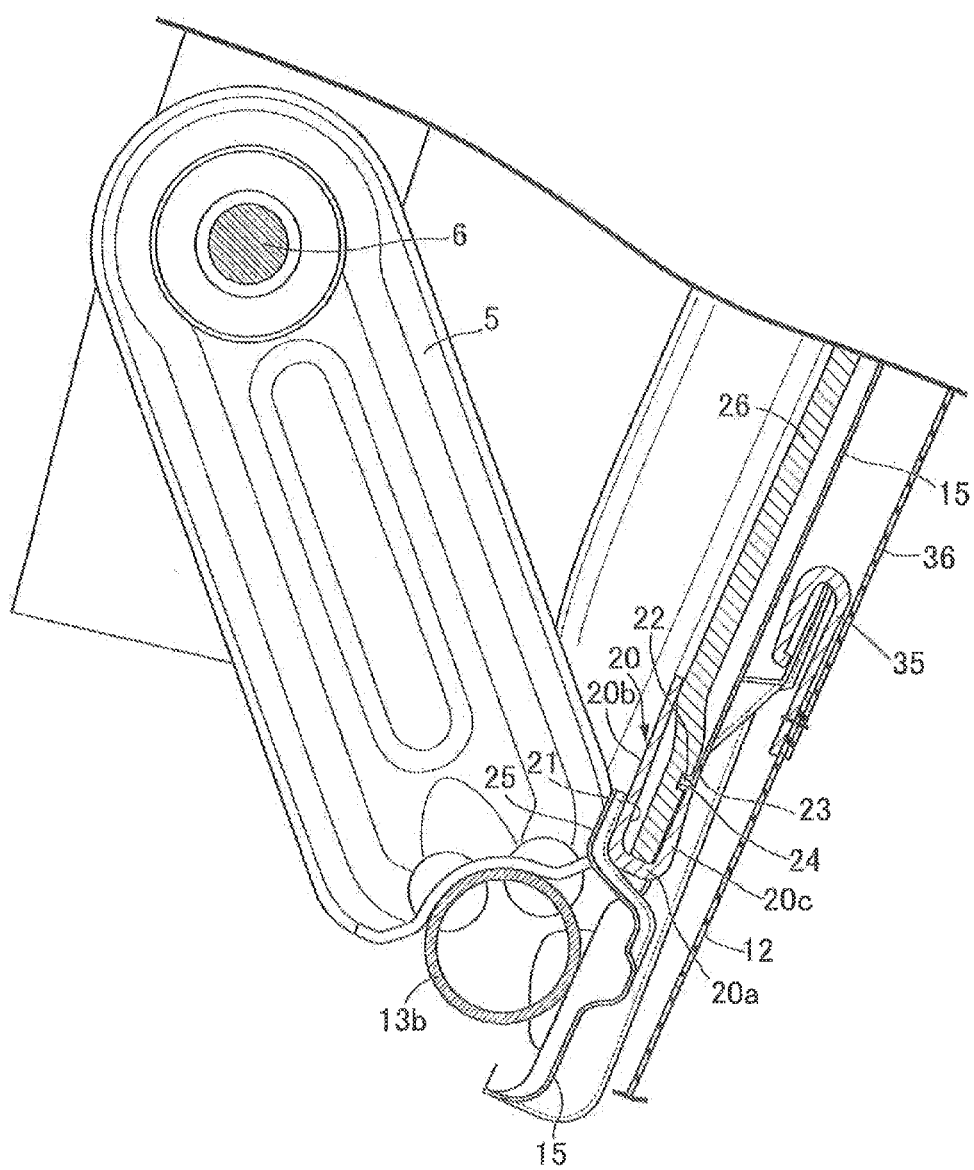
FIG. 4 is an enlarged sectional view along line 4-4 in FIG. 2.

In FIG. 1, a seat S in the illustrated example is a rear seat for three occupants installed on a floor of an automobile and is formed from a seat cushion 1 and a seat back 2 rising upwardly from a rear end part thereof, and an upper part of the seat back 2 is equipped with three headrests 3a, 3b, and 3c for three occupants arranged in the left-and-right direction. Furthermore, a housing recess part 4 is provided in a central part of the seat back 2, and an arm rest 7 supported via a pivot shaft 6 on a pair of left and right brackets 5 and 5 (see FIG. 3 and FIG. 4) disposed in a lower part within the housing recess part 4 can pivot between a storage position A at which it is housed in the housing recess part 4 (see FIG. 3) and a projecting position B at which it projects forwardly and is placed above the seat cushion 1. This arm rest 7 has a cup holder 8 provided in a face that is an upper face at the projecting position B.

In FIG. 1 to FIG. 3, FIG. 5, and FIG. 6, the seat back 2 is formed from a frame 10 and a cushion pad 11 supported on the frame 10, and the surface of the cushion pad 11 is covered by a leather or synthetic leather skin 12. The housing recess part 4 extends through a central part of the cushion pad 11, and an upper pad portion 11a and a lower pad portion 11b of the cushion pad 11 remain above and below the housing recess part 4.

The frame 10 is formed from a main frame 13 that is formed into a substantially rectangular shape so as to follow the outline of a rear face of the seat back 2, and a pair of left and right cross pipes 14 and 14 that link an upper side portion 13a and a lower side portion 13b of the main frame 13 on left and right sides of the housing recess part 4; the brackets 5 and 5 are secured to the lower side portion 13b of the main frame 13 by means of welding, etc., and a back panel 15 made of a thin steel sheet is secured to a rear face of the frame 10 by means of welding, etc.

Furthermore, three pairs of left and right support tubes 17 and 17 supporting a pair of left and right pillars 16 and 16 of each of the three headrests 3a, 3b, and 3c are secured to the upper side portion 13a by means of welding, etc.

In FIG. 3 to FIG. 11, the housing recess part 4 has an inner board 26 mounted as follows, the inner board 26 forming a back wall thereof.

Figure 5:
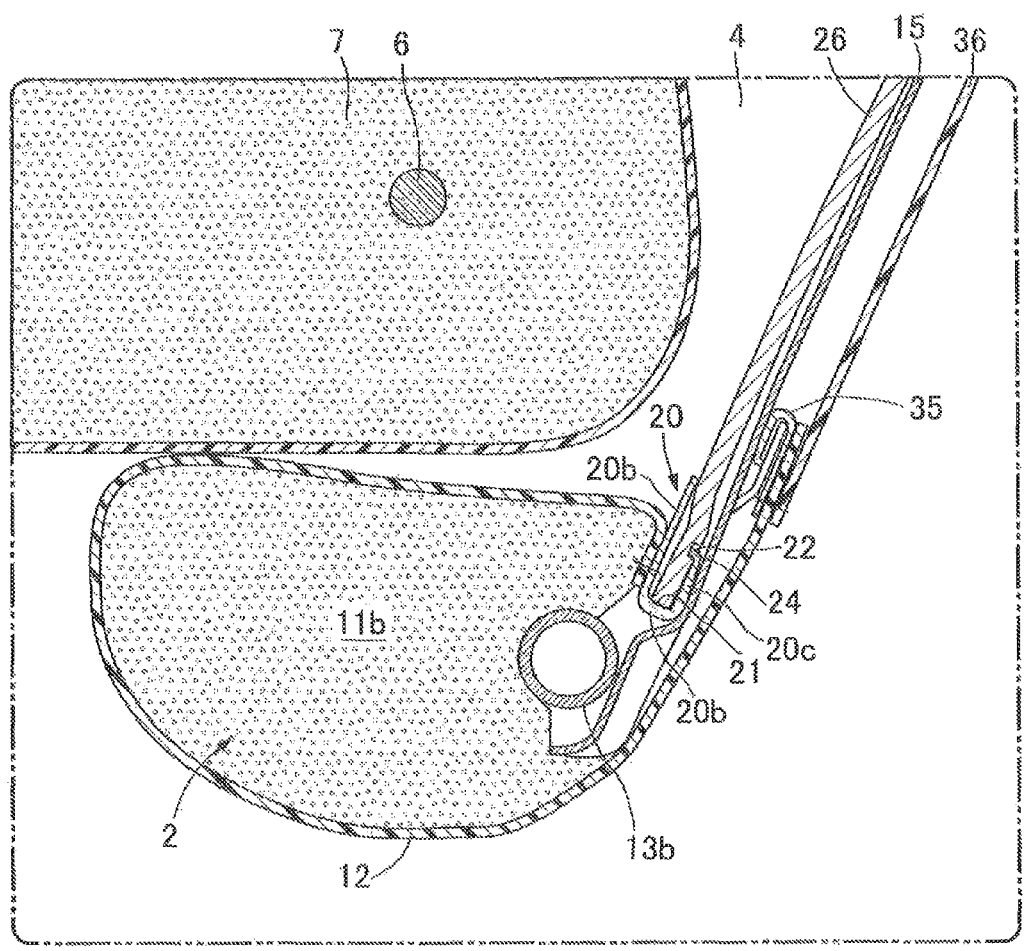
FIG. 5 is an enlarged view of part 5 in FIG. 3.
Figure 6:
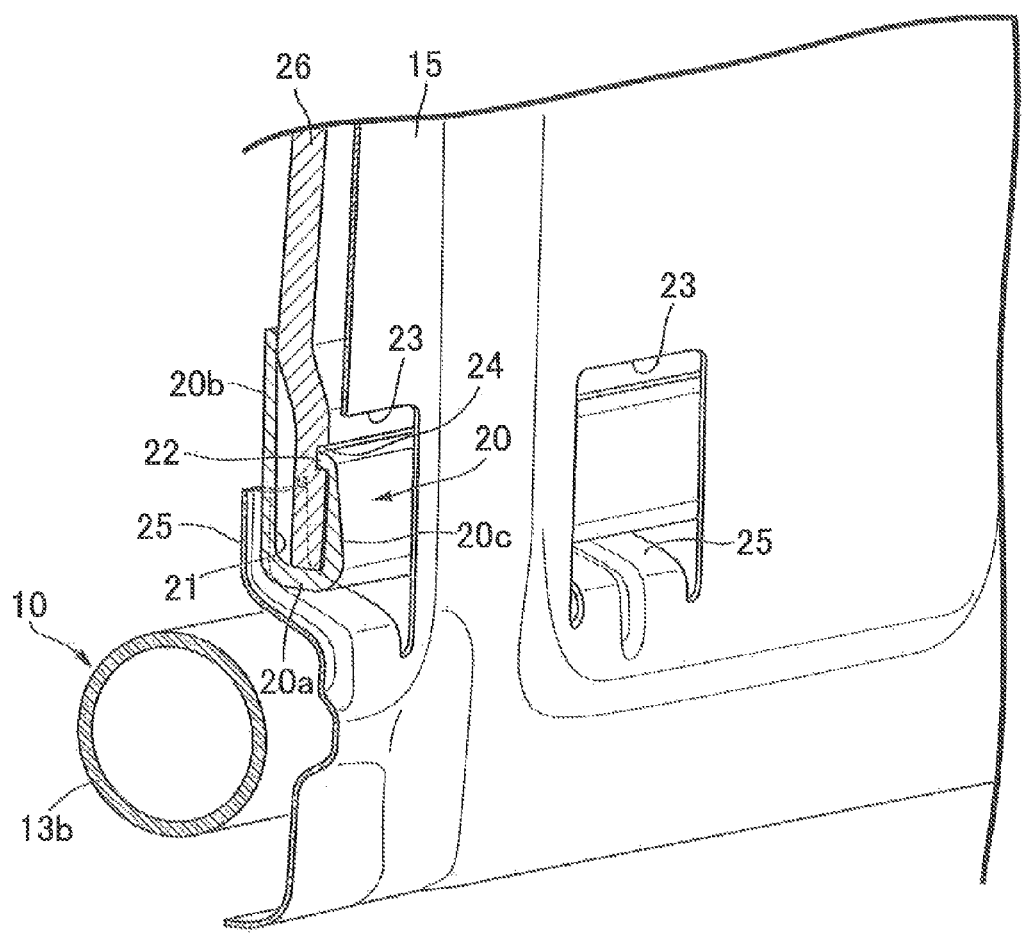
FIG. 6 is a perspective view of an essential part of FIG. 5.

As shown in FIG. 5 and FIG. 6, a plurality of support pieces 25 and 25 projecting upwardly to the front are formed on a portion, corresponding to the underneath of the housing recess part 4, of the back panel 15 by punching from the rear, and a board support member 20 is held between these support pieces 25 and 25 and the back panel 15, the board support member 20 having a length that falls within the range of the overall width in the left-and-right direction of the housing recess part 4.

The board support member 20 is made of a synthetic resin and is formed from a bottom wall portion 20a and a front wall portion 20b and rear wall portion 20c rising from front and rear edges of the bottom wall portion 20a, a U-shaped retaining groove 21 having an open upper face being defined by these bottom wall portion 20a, front wall portion 20b, and rear wall portion 20c. An upper end part of the rear wall portion 20c has molded integrally therewith a latching projection 22 projecting so as to bend toward the retaining groove 21 side, the latching projection 22 having a rib shape extending in the left-and-right direction.

The front wall portion 20b and the rear wall portion 20c extend further upward than the support pieces 25 and 25, and the front wall portion 20b extends further upward than the rear wall portion 20c. A plurality of openings 23 and 23 formed when forming the support pieces 25 and 25 by punching are left in the back panel 15.

A lower end part of the inner board 26 is fitted from above into the retaining groove 21 through the housing recess part 4 from the front of the seat back 2. In this arrangement, a latching groove 24 is formed in a rear face of the inner board 26 so as to extend across the whole width in the left-and-right direction, and the latching projection 22 engages with the latching groove 24. That is, the lower end part of the inner board 26 is inserted into the retaining groove 21, the front wall portion 20b and the rear wall portion 20c elastically open apart temporarily so as to receive the lower end part of the inner board 26, and when the latching groove 24 reaches the position of the latching projection 22, the front wall portion 20b and the rear wall portion 20c narrow the distance therebetween by virtue of the force restoring them to their original shape and the latching projection 22 engages with the latching groove 24. Due to this engagement, upward escape of the inner board 26 from the latching groove 24 is suppressed.

A rear end part of the skin 12 covering an upper face of the lower pad portion 11b is sewed onto the front wall portion 20b of the board support member 20.

Figure 7:
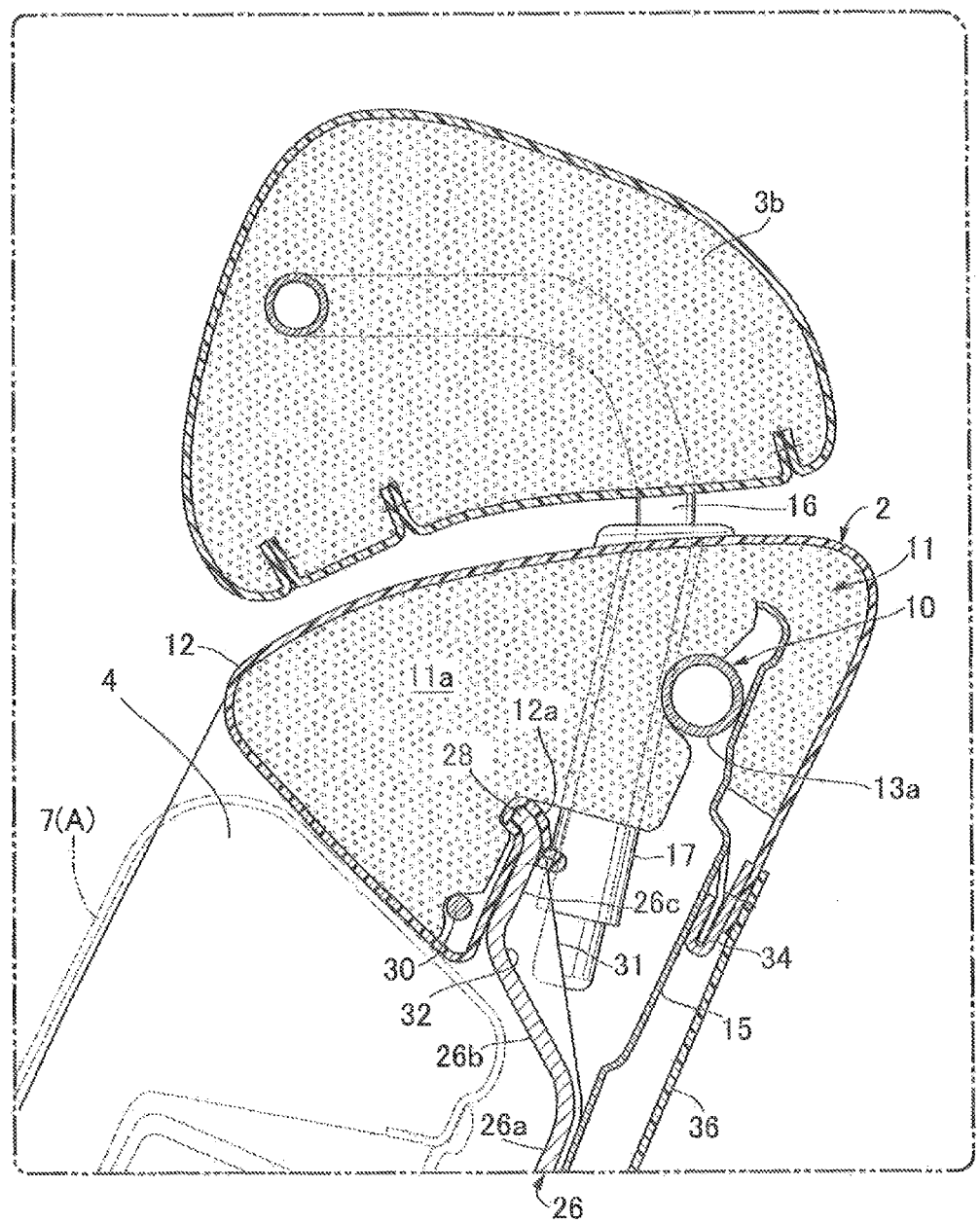
FIG. 7 is an enlarged view of part 7 in FIG. 3.
Figure 8:
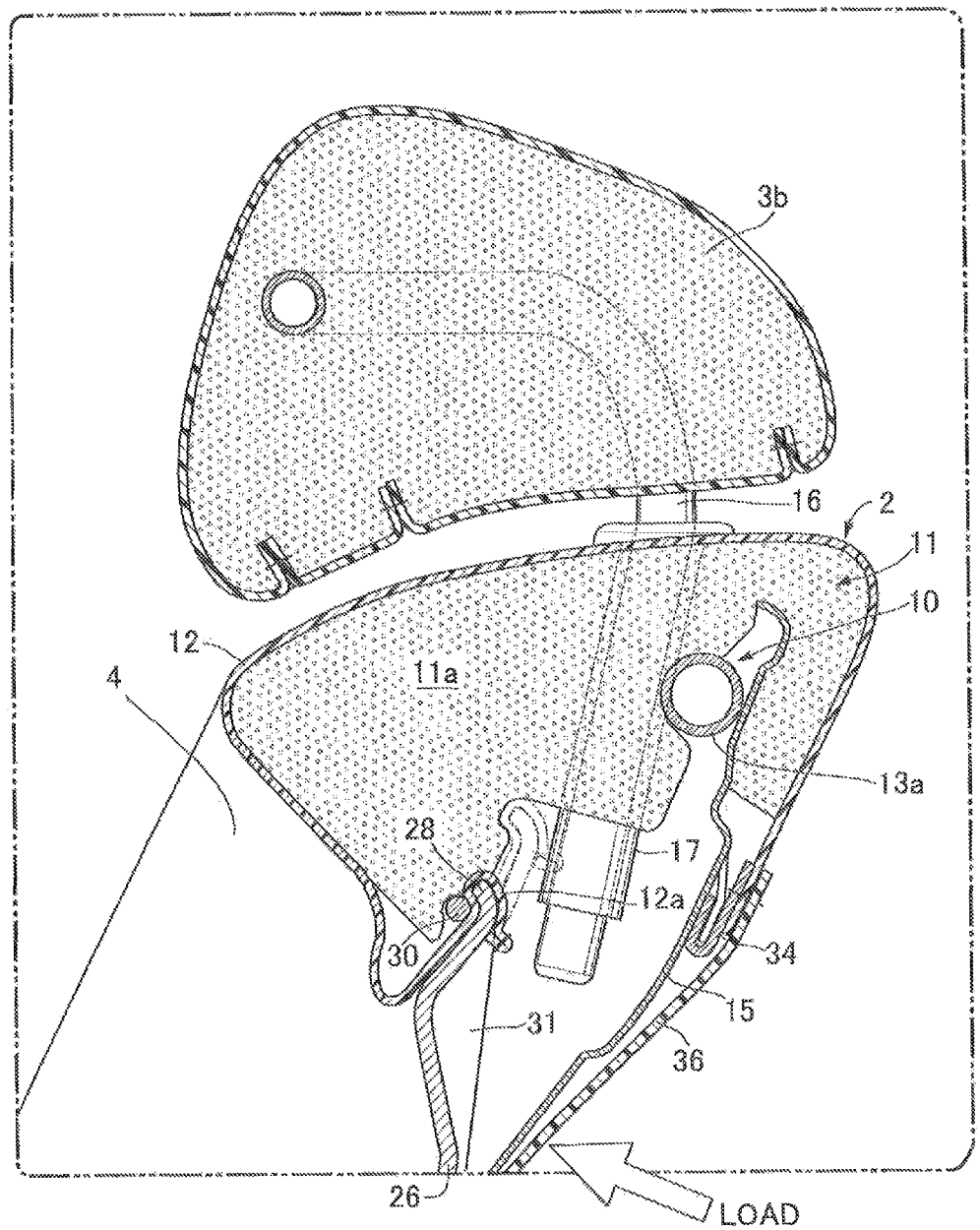
FIG. 8 is a diagram, corresponding to FIG. 7, for explaining the operation of an inner board.
Figure 9:
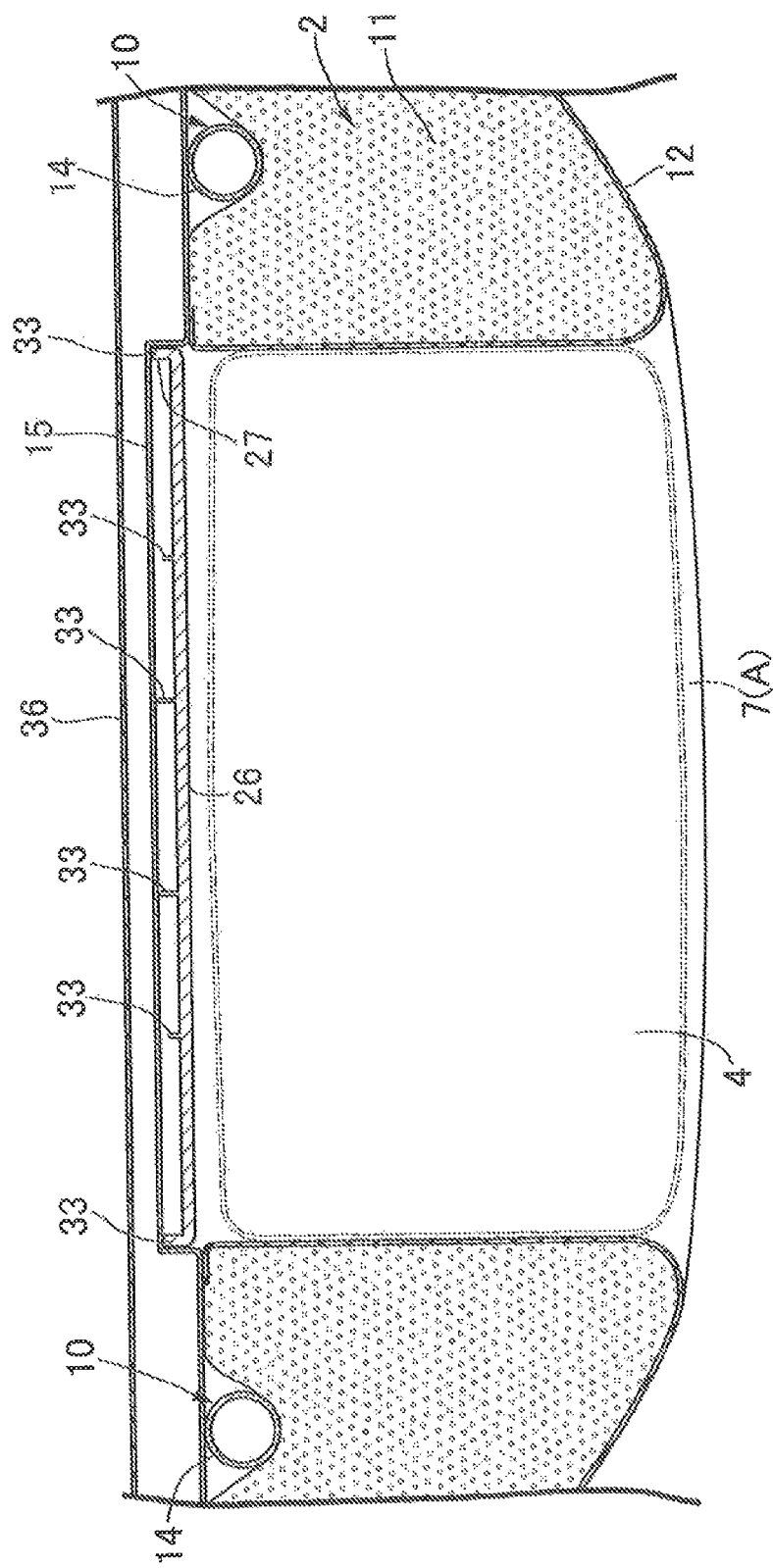
FIG. 9 is an enlarged sectional view along line 9-9 in FIG. 2.
Figure 10:
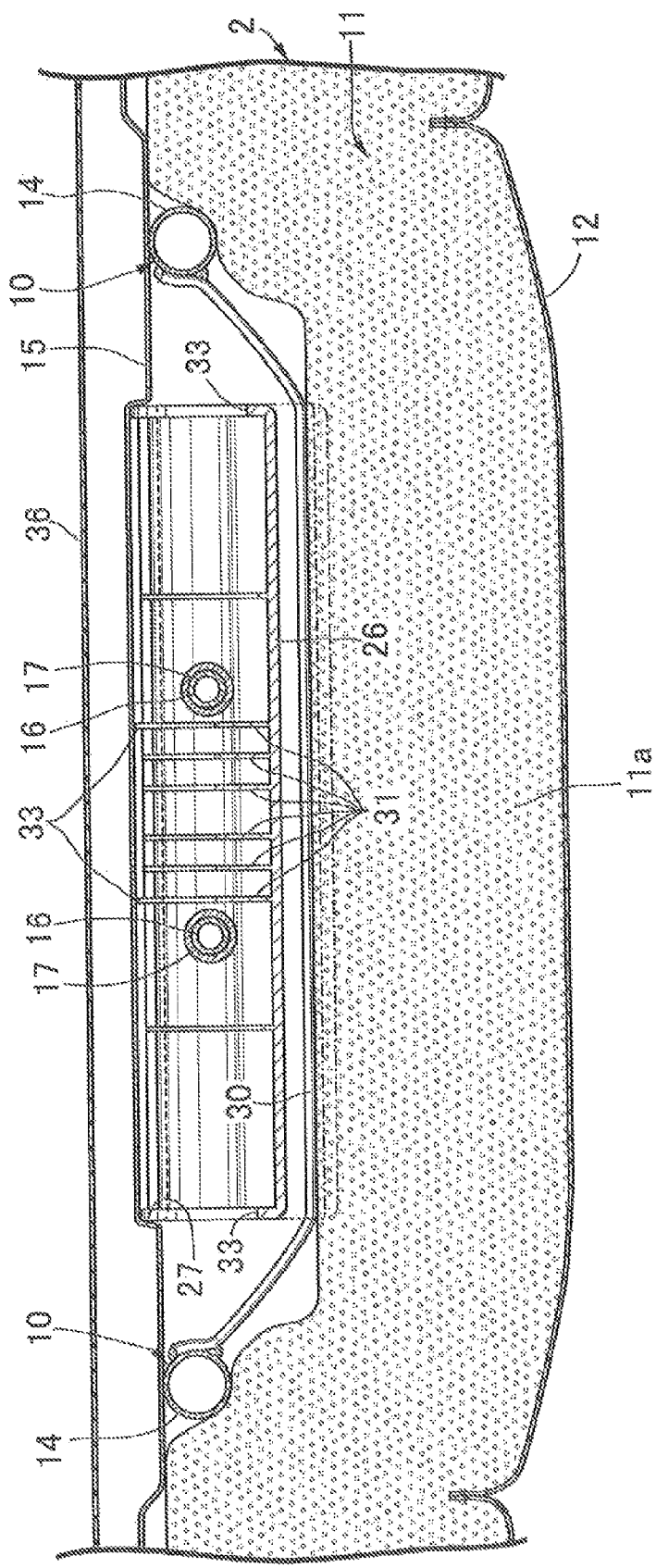
FIG. 10 is an enlarged sectional view along line 10-10 in FIG. 2.
Figure 11:
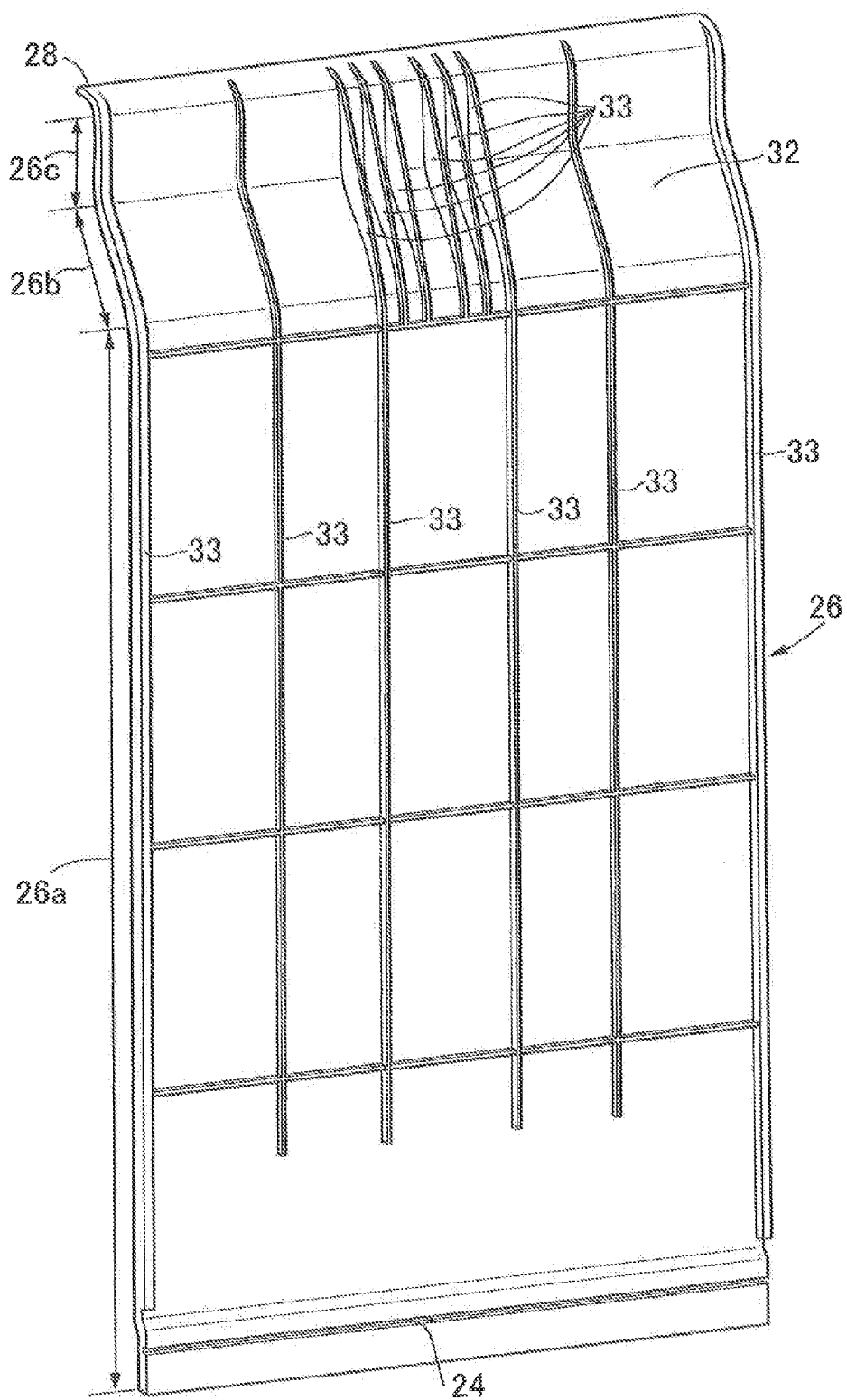
FIG. 11 is a perspective view of the inner board.

As shown in FIG. 7, with regard to the upper pad portion 11a supported on the upper side portion 13a of the main frame 13, a lower end part of the skin 12 covering a front face thereof extends toward the reverse side of the housing recess part 4 so as to form a pouch-shaped portion 12a; after an upper end part of the inner board 26 having the lower end part fitted into the retaining groove 21 is covered with the pouch-shaped portion 12a, the upper end part of the inner board 26 is shifted to the reverse side of the housing recess part 4 while greatly flexing an intermediate part of the inner board 26 to the front, and the inner board 26 is then returned to its original shape by virtue of its elastic restoration force. As a result, the upper end part of the inner board 26 is elastically supported, together with the pouch-shaped portion 12a, on a rear face of a lower part of the upper pad portion 11a of the cushion pad 11, and the reaction force of the upper pad portion 11a presses the inner board 26 so that it abuts against the back panel 15. In this arrangement, as shown in FIG. 9, a relatively shallow positioning recess part 27 is formed in a front face of the back panel 15, and due to the inner board 26 engaging with the positioning recess part 27, movement in the left-and-right direction of the inner board 26 is restricted. In this way, the inner board 26 becomes the back wall of the housing recess part 4.

A rear end part of the skin 12 covering the entire upper face of the cushion pad 11 is turned to the reverse side of the back panel 15 and sewed onto an upper skin support member 34 mounted on the rear face of an upper part of the back panel 15.

As shown in FIG. 7 to FIG. 11, the inner board 26 is formed from a flat-plate portion 26a abutting against the back panel 15 while being fitted into the retaining groove 21 (FIG. 6), an inclined portion 26b bending upwardly to the front from the upper end of the flat-plate portion 26a so as to avoid the pair of left and right support tubes 17 and 17 supporting the headrest 3b at the middle position, and a rising portion 26c rising upwardly from the upper end of the inclined portion 26b, and a latching claw 28 bending forwardly in an arc shape is integrally formed with the upper end of the rising portion 26c. The rising portion 26c and the latching claw 28 are supported on the rear face of the lower part of the upper pad portion 11a.

A stopper member 30 that will oppose a lower face of the latching claw 28 while contacting the skin 12 covering a lower face of the upper pad portion 11a is secured by welding, etc. opposite ends of the stopper member 30 to the left and right cross pipes 14 and 14 of the frame 10; when the inner board 26 is pressed toward the housing recess part 4 side by means of a load from the rear and flexingly deformed, the latching claw 28 engages with the stopper member 30 via the pouch-shaped portion 12a of the skin 12 (see FIG. 8), thus suppressing forward and downward movement of the upper end part of the inner board 26. The stopper member 30 is formed from a steel wire having a circular cross section whereas an inner face of the latching claw 28, which can engage therewith, is an arc face, thus ensuring a large engagement area between the stopper member 30 and the latching claw 28.

Furthermore, in order to enhance the stiffness between the inclined portion 26b and the latching claw 28, a plurality of reinforcing ribs 31 integrally linking the inclined portion 26b and the latching claw 28 are formed on a rear face of the inner board 26. These reinforcing ribs 31 are formed into a triangular shape when viewed from the side so as to fill a valley part 32 between the inclined portion 26b and the rising portion 26c in order to enhance effectively the stiffness between the inclined portion 26b and the latching claw 28. In this arrangement, these reinforcing ribs 31 are disposed between the pair of left and right support tubes 17 and 17 to thus avoid interference with the support tubes 17 and 17 supporting the headrest 3b at the middle position.

Moreover, a plurality of ribs 33 that are lower than the reinforcing ribs 31 are formed integrally with the rear face of the inner board 26 throughout substantially the whole length in the vertical direction in order to impart appropriate stiffness to the entirety of the inner board 26.

The rear end part of the skin 12 covering the upper face of the lower pad portion 11b is sewed onto the front wall portion 20b of the board support member 20 (see FIG. 5). Furthermore, the skin 12 covering the entire lower face of the cushion pad 11 is sewed onto a lower skin support member 35 secured to a rear face of a lower part of the back panel 15. Furthermore, vertically opposite end parts of a cover sheet 36 covering the rear face of the back panel 15 are sewed onto the upper and lower skin retaining members 34 and 35 (see FIG. 3, FIG. 5, and FIG. 7).

The operation of this embodiment is now explained.

When, in order to use the arm rest 7, it is pulled out to the projecting position B from the housing recess part 4 of the seat back 2, the interior of the housing recess part 4 can be seen from the vehicle compartment side, but since the rear opening face of the housing recess part 4 is closed by the inner board 26, even if a small item is dropped into the housing recess part 4, the inner board 26 can prevent the small item from going into the reverse side of the seat back 2, and the appearance can also be improved.

Furthermore, at a time of sudden braking, etc. of an automobile, when luggage in a luggage compartment to the rear of the rear seat S moves forcefully forward by virtue of inertial force, collides with the back panel 15, which is a thin steel sheet, and pushes the inner board 26 forward while the impact load forwardly deforms the back panel 15, since upward movement of the inner board 26 is suppressed due to engagement between the latching groove 24 of the lower end part thereof and the latching projection 22 of the board support member 20, the inner board 26 pivots forwardly with the board support member 20 as a fulcrum, and the latching claw 28 in the upper end part of the inner board 26, together with the pouch-shaped portion 12a of the skin 12, engages with the stopper member 30 while deforming the upper pad portion 11a (see FIG. 8), thereby suppressing forward and downward movements. This enables excessive forward pivoting and flexing of the inner board 26 to be suppressed, thus ensuring the durability of the inner board 26. Therefore, it becomes unnecessary to provide the rear opening of the housing recess part 4 with a special load-receiving member that receives a load from the rear and protects an inner board, and it becomes possible to simplify the structure of the seat device for a vehicle and, consequently, to reduce the cost. In this process, the latching claw 28 deforms the cushion pad 11 until the latching claw 28 engages with the stopper member 30, thus softening the impact of engagement between the latching claw 28 and the stopper member 30 and thereby improving the durability of the latching claw 28.

Furthermore, since the upper end part of the inner board 26 is supported on the rear face of the cushion pad 11, and the back panel 15, against which the inner board 26 abuts by receiving the elastic repulsive force of the cushion pad 11, is secured to the frame 10 of the seat back 2, it is possible, by utilizing the cushion pad and the back panel that are inherently provided on the seat back 2, to support the inner board 26, thereby further simplifying the structure of the seat device for a vehicle.

Moreover, since the latching claw 28 is molded integrally with the inner board 26, it is possible to further contribute to simplification of the structure and reduction of the cost without increasing the number of components due to the latching claw 28.

Furthermore, since the reinforcing ribs 31 linking the inner board 26 and the latching claw 28 are formed therebetween, it is possible to suppress effectively flexing between the inner board 26 and the latching claw 28.

Moreover, since the inner board 26 is formed from the flat-plate portion 26a abutting against the back panel 15, the inclined portion 26b bending forwardly from the upper end of the flat-plate portion 26a so as to avoid the support tubes 17 and 17 for the headrest 3b fixedly provided on the upper part of the frame 10 of the seat back 2, and the rising portion 26c rising from the upper end of the inclined portion 26b, the latching claw 28 is formed integrally with the upper end of the rising portion 26c, and the three portions, that is, the latching claw 28, the rising portion 26c, and the flat-plate portion 26a are linked continuously by the reinforcing ribs 31, it is possible to suppress effectively flexing of the three portions, that is, the latching claw 28, the rising portion 26c, and the flat-plate portion 26a and also to reinforce the stiffness of the latching claw, thereby improving engagement of the latching claw 28 with the stopper member 30.

Furthermore, since the reinforcing ribs 31 are formed as a plurality of straight lines so as to cross the valley part 32 between the inclined portion 26b and the rising portion 26c, and these reinforcing ribs 31 are disposed between the pair of left and right support tubes 17 and 17, it is possible to reinforce effectively the stiffness of the latching claw 28 and an area around its base while avoiding interference between the reinforcing ribs 31, which are tall, and the support tubes 17 and 17 for the headrest 3b.

Moreover, since the stopper member 30 is formed so as to have a circular cross section whereas the inside face of the latching claw 28 abutting against the outer peripheral face of the stopper member 30 is formed into an arc face so as to increase the engagement area of the latching claw 28 and the stopper member 30 so that it is as wide as possible, it is possible to suppress an increase in the engagement pressure between the latching claw 28 and the stopper member 30, thus ensuring durability of the latching claw 28.

Furthermore, since in order to suppress upward movement of the inner board 26 the latching projection 22 and the latching groove 24, which engage with each other to thus suppress upward movement of the inner board 26, are formed respectively on one and the other of opposing side faces of the retaining groove 21 of the board support member 20 and the lower end part of the inner board 26 fitted thereinto, it is possible, merely by fitting the lower end part of the inner board 26 into the retaining groove 21, to obtain engagement between the latching projection 22 and the latching groove 24 and easily suppress upward movement of the inner board 26, and it therefore becomes unnecessary to use a special securing member for suppressing disengagement of the inner board 26 from the retaining groove 21, thus improving simplification of the structure and ease of assembly of the seat device for a vehicle and contributing to a reduction in cost.

Moreover, since the latching groove 24 is formed over the whole width in the left-and-right direction on the side face of the inner board 26, and the latching projection 22 is formed on the inside face of the retaining groove 21, it is possible to engage the latching projection 22 with the latching groove 24 at any position along the left-and-right direction of the inner board 26, thus improving the ease of assembly.

Furthermore, since the latching projection 22 is molded integrally into a rib shape with the board support member 20, not only is it possible to avoid any increase in the number of components due to the latching projection 22, but it is also possible to reinforce the stiffness of the board support member 20 due to the latching projection functioning as a reinforcing rib, thereby enhancing the engagement force with the latching groove 24.

Moreover, since the board support member 20 is formed from the bottom wall portion 20a and the front wall portion 20b and rear wall portion 20c rising from the front and rear edges of the bottom wall portion 20a and defining the retaining groove 21 therebetween, the latching projection 22 is formed so as to bend from an upper end part of one of the front wall portion 20b and the rear wall portion 20c toward the retaining groove 21 side, and the board support member 20 and the latching projection 22 are integrally molded, it is possible for the board support member 20 equipped with the latching projection 22 to form one component, thus contributing to simplification of the structure of the seat device for a vehicle. Furthermore, the board support member 20, which is integrally formed from the bottom wall portion 20a, the front wall portion 20b, and the rear wall portion 20c, gives a structure with a channel-shaped cross section having high stiffness, thus enabling the inner board 26 to be strongly supported.

Moreover, since in the board support member 20 the latching projection 22 is formed on the rear wall portion 20c and the front wall portion 20b is formed so as to extend higher than the rear wall portion 20c, when the intermediate part of the inner board 26 flexes forwardly due to application of a load from the rear, in the board support member 20 the inner board 26 tilts forwardly with the upper end of the front wall portion 20b, which is tall, as the fulcrum, the latching groove 24 on the rear face of the inner board 26 accordingly engages more strongly with the latching claw 28 on the upper end part of the rear wall portion 20c, which is short, and upward disengagement of the inner board 26 can be suppressed effectively.

Furthermore, since the back panel 15 secured to the frame 10 and covering the rear face of the seat back 2 is provided with the support pieces 25 and 25, projecting upwardly to the front, formed by punching from the rear, and the board support member 20 is held between the support pieces 25 and 25 and the back panel 15, it is possible to mount the inner board 26 on the frame 10 without using a special support member, thus further contributing to simplification of the structure of the seat device for a vehicle and, moreover, since the state in which the board support member 20 is held by the support pieces 25 and 25 and the back panel 15 can be visually checked through the openings 23 and 23 resulting from punching of the back panel 15 for forming the support pieces 25 and 25, it is possible to visually check the state of support of the inner board 26 without providing an observation window exclusively used therefor in the back panel 15, thus enabling assembly faults to be prevented.

Figure 12:
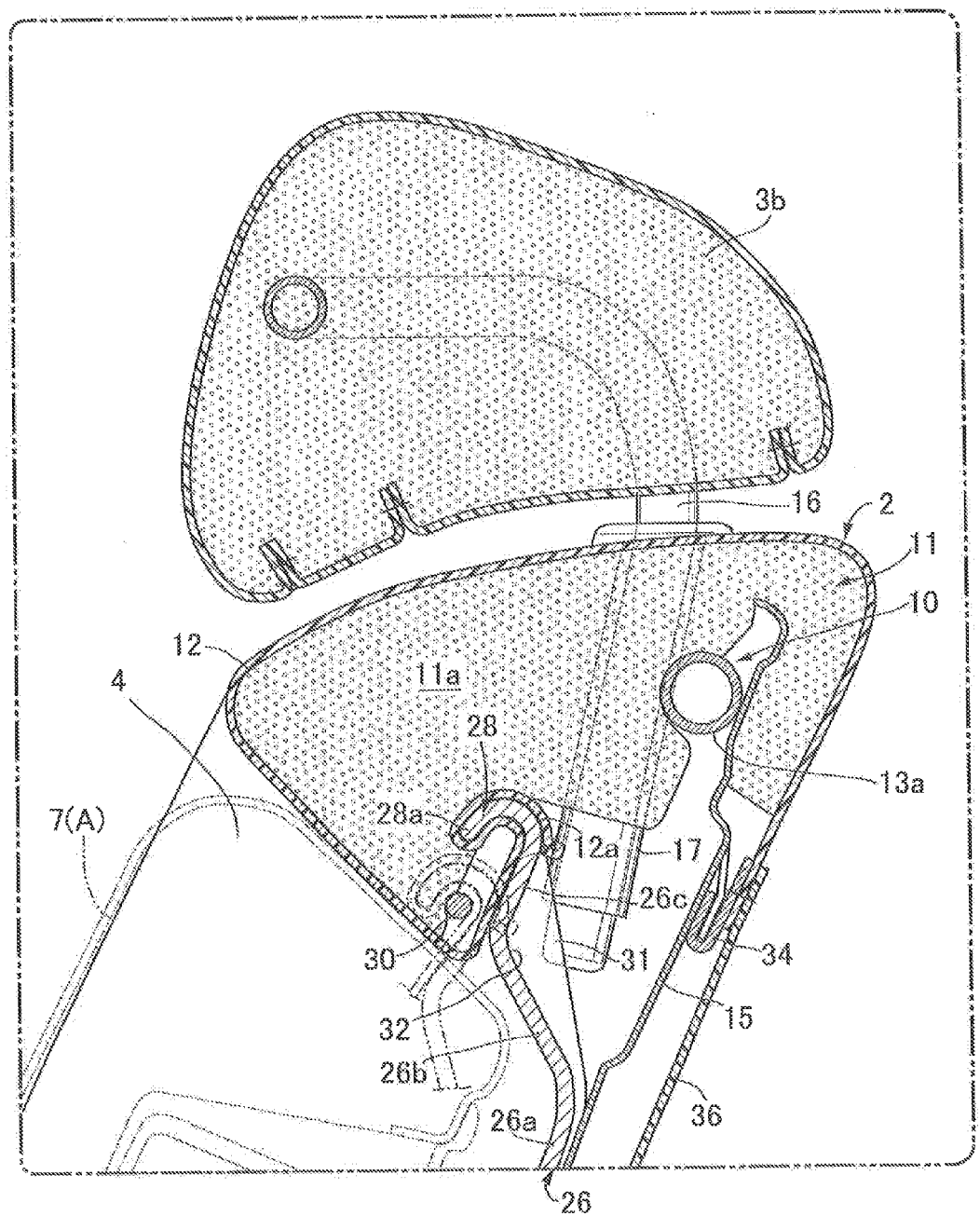
FIG. 12 is a diagram, corresponding to FIG. 6, showing another embodiment of the present invention.

Another embodiment of the present invention shown in FIG. 12 is now explained.

In this embodiment, a latching claw 28 formed on an upper end part of an inner board 26 is provided with a U-shaped turnover portion 28a, and the latching claw 28 can engage with half the periphery of a stopper member 30. The arrangement is otherwise the same as that of the preceding embodiment; portions in FIG. 12 corresponding to the preceding embodiment are denoted by the same reference numerals and symbols, and duplication of the explanation is omitted.

In accordance with this embodiment, when the latching claw 28 engages with the stopper member 30, due to the latching claw 28 engaging with half of the periphery of the stopper member 30, even if the inner board 26 flexes forwardly by a large amount, it is possible to suppress disengagement of the latching claw 28 from the stopper member 30, thus enabling excessive movement and deformation of the inner board 26 to be suppressed.

The present invention is not limited by the above embodiments and may be modified in a variety of ways as long as the modifications do not depart from the spirit and scope thereof. For example, instead of the arm rest 7, a side table equipped with the cup holder 8 may be housed in the housing recess part 4. Furthermore, the seat device of the present invention is not limited to use in an automobile and may be applied to a rail car, an airplane, etc.

The invention claimed is:

1. A seat device for a vehicle, comprising a seat back, an auxiliary member that is axially supported on the seat back and can pivot between a storage position at which the auxiliary member is housed in a housing recess part formed so as to extend through a cushion pad of the seat back and a projecting position at which the auxiliary member projects forward of the seat back, and an inner board that closes a rear opening face of the housing recess part, a board support member having a retaining groove into which a lower end part of the inner board is fitted from above being mounted on a frame of the seat back,
wherein a latching projection and a latching groove are formed, respectively, on first and second opposing faces of the retaining groove, and the lower end part of the inner board is fitted thereinto, the latching projection and the latching groove being engaged with each other so as to suppress upward movement of the inner board.

2. The seat device for a vehicle according to claim 1, wherein the latching groove is formed in a side face of the inner board across the whole width in the left-and-right direction, and the latching projection is formed on an inside face of the retaining groove.

3. The seat device for a vehicle according to claim 2, wherein:
the board support member is formed from a bottom wall portion and a front wall portion and rear wall portion that rise from front and rear edges of the bottom wall portion, respectively, so as to define the retaining groove therebetween,
the latching projection is formed so as to bend from an upper end part of one of the front wall portion and the rear wall portion toward the retaining groove side, and
the board support member and the latching projection are integrally molded.

4. The seat device for a vehicle according to claim 3, wherein the latching projection is formed on the rear wall portion, and the front wall portion is formed so as to extend higher than the rear wall portion.

5. The seat device for a vehicle according to claim 2, wherein the latching projection is molded into a rib shape integrally with the board support member.

6. The seat device for a vehicle according to claim 2, wherein:
a forwardly projecting support piece, formed by punching from the rear, is provided on a back panel that is secured to the frame and that covers a rear face of the seat back,
the board support member is held between the support piece and the back panel,
and the state in which the board support member is held by the support piece and the back panel can be visually checked through an opening, which is formed as a result of punching of the back panel for forming the support piece.

7. The seat device for a vehicle according to claim 1, wherein the latching projection is molded into a rib shape integrally with the board support member.

8. The seat device for a vehicle according to claim 1, wherein:
a forwardly projecting support piece, formed by punching from the rear, is provided on a back panel that is secured to the frame and that covers a rear face of the seat back,
the board support member is held between the support piece and the back panel, and
the state in which the board support member is held by the support piece and the back panel can be visually checked through an opening, which is formed as a result of punching of the back panel for forming the support piece.

* * * * *